United States Patent [19]

Mills

[11] Patent Number: 4,697,375
[45] Date of Patent: Oct. 6, 1987

[54] FISHING POLE TIP POSITION SIGNALLING LIGHT ASSEMBLY

[75] Inventor: Kenneth L. Mills, Charleston, W. Va.

[73] Assignee: The Nite-Striker Company, Inc., Marmet, W. Va.

[21] Appl. No.: 865,836

[22] Filed: May 22, 1986

Related U.S. Application Data

[63] Continuation-in-part of Ser. No. 779,692, Sep. 24, 1985, abandoned.

[51] Int. Cl.$^4$ ............................................. A01K 87/04
[52] U.S. Cl. ......................................... 43/17.5; 43/24
[58] Field of Search ................................. 43/17.5, 24

[56] References Cited

U.S. PATENT DOCUMENTS

| | | | |
|---|---|---|---|
| 3,017,499 | 1/1962 | Fore | 43/17.5 |
| 4,505,063 | 3/1985 | Price et al. | 43/17.5 |

FOREIGN PATENT DOCUMENTS

| | | | |
|---|---|---|---|
| 2,052,231 | 1/1981 | United Kingdom | 43/17.5 |
| 305,860 | 1/1970 | U.S.S.R. | 43/17.5 |

Primary Examiner—Nicholas P. Godici
Assistant Examiner—Karen Skillman
Attorney, Agent, or Firm—Mason, Fenwick & Lawrence

[57] ABSTRACT

A lightweight fishing pole tip signal light for indicating the position and movement of the tip portion of the fishing pole at night or under conditions of low visibility, which includes an axially elongated hollow tubular mounting sleeve member having a bore whose diameter corresponds substantially to the diameter of the tip end of the pole to be mounted on the tip end of the fishing pole, an LED light emitter supported within the bore of the sleeve member having the light emitting portion thereof projecting through an opening in the sleeve member to emit light visible to the person using the fishing pole, and a fishing line guide ring fixed by supporting arms extending from the sleeve member in forwardly spaced relation to the light emitter. The sleeve member may be adhesively secured to the tip end portion of the pole, or fixed thereto by an adaptor sleeve which is threadedly coupled to the sleeve member and the LED and portions of the guide ring may be encapsulated in a plastic resin having light diffusing or phosphorescent qualities. Circle light emitting means is also provided, in the form of a ring of phosphorescent material guide ring activated by the light from the LED light emitter, or formed of a circular LED member, to provide a circle of light at the guide ring surface.

6 Claims, 11 Drawing Figures

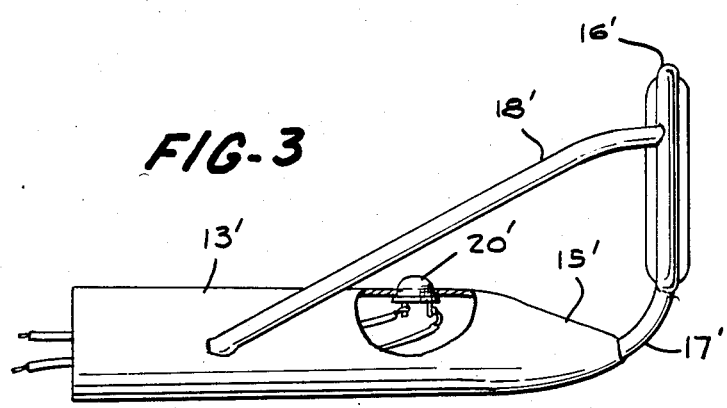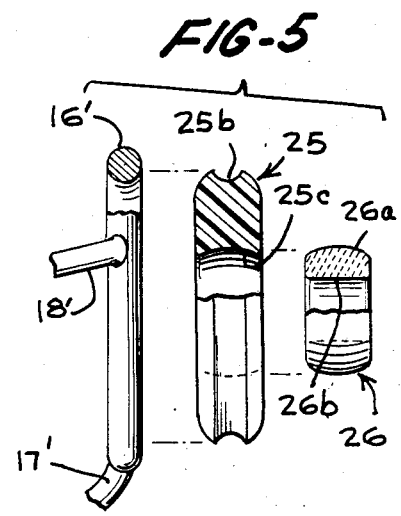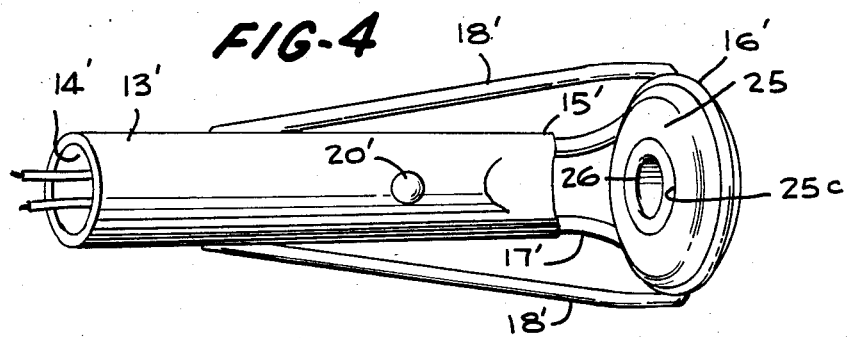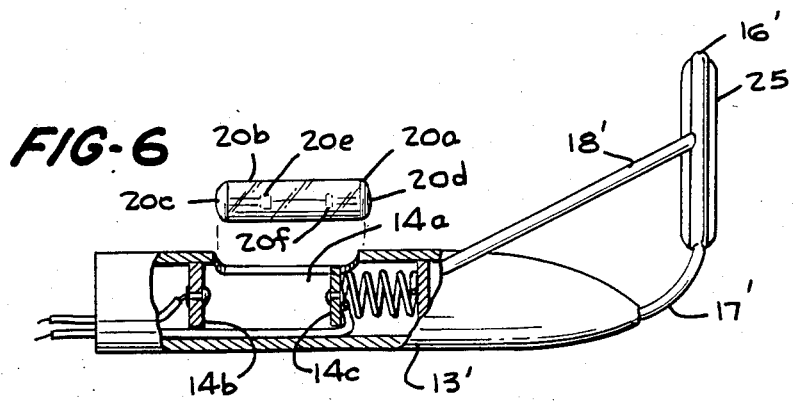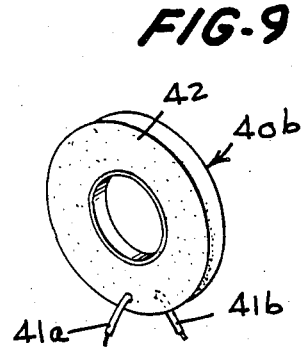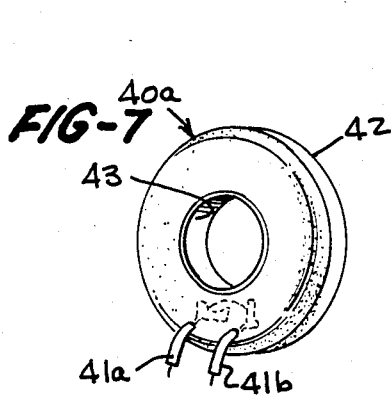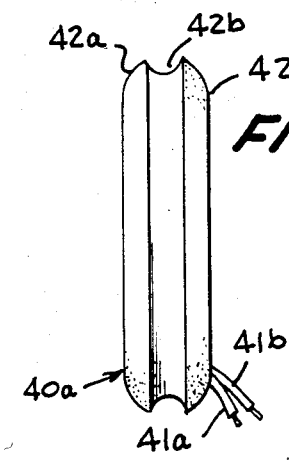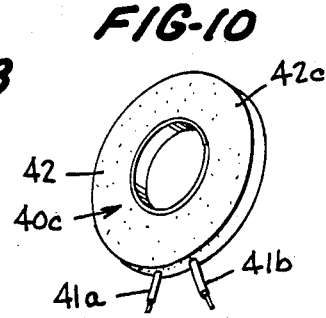

FISHING POLE TIP POSITION SIGNALLING LIGHT ASSEMBLY

PRIOR RELATED APPLICATION

This application is a continuation-in-part of my earlier application Ser. No. 779,692 filed Sept. 24, 1985 abandoned 5/23/86.

BACKGROUND AND OBJECTS OF THE INVENTION

The present relates in general to fishing rods, and more particularly to a lightweight fishing pole tip signal light for indicating the position or movement of the tip portion of the fishing pole at night or under conditions of low visibility.

A number of devices have been previously known in the prior art wherein some form of light emitting device or arrangement is associated with a fishing pole for illuminating the length of the fishing pole or indicating the position or movement of the fishing pole tip to enable a person using the fishing pole to see the tip position at night or under conditions of low visibility. Such prior art devices have, for the most part, been relatively bulky or cumbersome to use and relatively expensive. Further, many of such prior art devices are not mounted at the tip of the pole and therefore do not accurately indicate the position or movement of the tip which occurs when a fish strikes the hook on a line guided on the pole through an eye or guide ring on the tip. Further, the prior art devices frequently interfered with operation of the fishing pole because of their excessive weight and size.

It has been thought by many fisherman that the best fishing, in a number of areas, is found to occur at night, especially in surf fishing and the like. Unless some means is provided on the fishing pole itself for indicating when a fish has struck the hook on the fishing line guided by the fishing pole, it is very difficult for the fisherman to know when he has a strike or a nibble. Also, if the fishing pole is dropped in shallow water or on the ground during night fishing, it is often difficult to locate the fishing pole. Many fisherman who engage in night fishing currently rely on the use of flashlights or lanterns or other cumbersome devices to cast sufficient light to enable the fisherman to see the position or movement of the fishing pole, but the use of such sources of light create disadvantages to night fishing in many respects.

An object of the present invention, therefore, is the provision of a novel lightweight fishing pole tip lighting device for permitting visual observation of the position or movement of the fishing pole tip, wherein the device is economical and can be readily attached to the tips of existing fishing poles and does not interfere with the normal functioning of the fishing pole, and which makes use of convenient LED light emitting devices.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 3 is a side elevational view of another form of the tip position illuminating device;

FIG. 4 is a perspective view thereof, viewed from above the longitudinal axis of the elongated mounting sleeve thereof;

FIG. 5 is an exploded side elevational view of the tip guide ring, phosphorescent bushing, and ceramic line guide components thereof;

FIG. 6 is an exploded perspective view of another form thereof, with parts broken away;

FIG. 7 is a perspective view of a preferred form of an LED self-illuminating ring device to fit in the tip ring of a fishing pole embodying the present invention;

FIG. 8 is an exploded elevational view of the LED ring device of FIG. 7, with an associated tip ring fixture; and FIGS. 9 and 10 are perspective views of other forms of LED ring devices which may be used in the fishing rod tip guide ring.

DETAILED DESCRIPTION OF A PREFERRED EMBODIMENT

Figure 1:
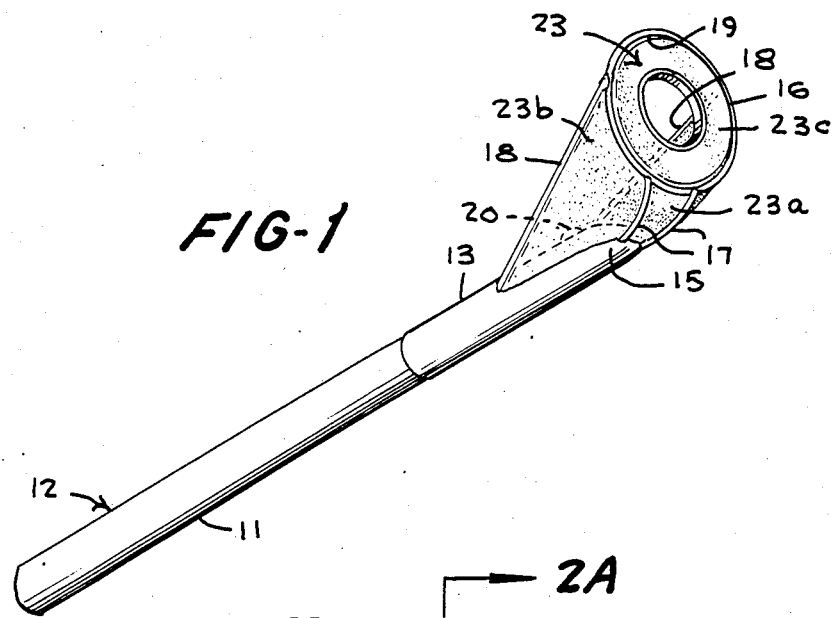
FIG. 1 is a fragmentary perspective view of the tip portion of a fishing pole having one form of a tip position illuminating attachment mounted thereon embodying the present invention.
Figure 2:
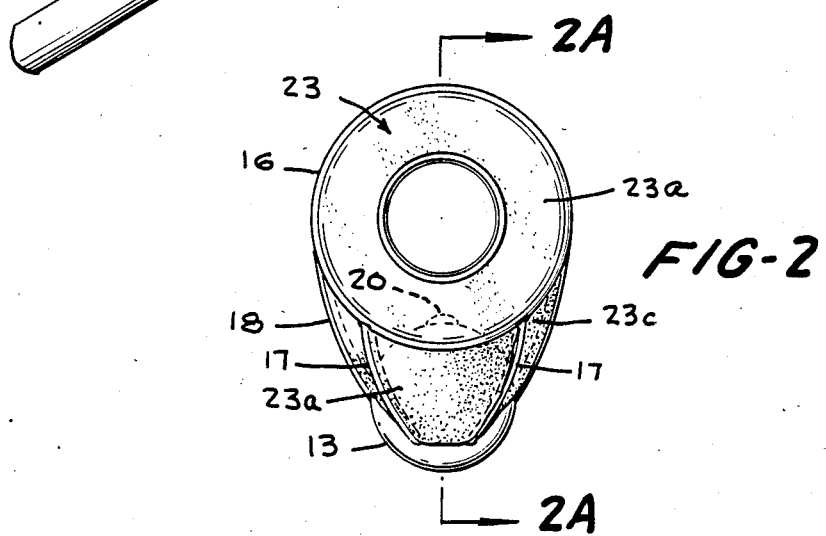
FIG. 2 is a perspective view thereof.
Figure 2A:
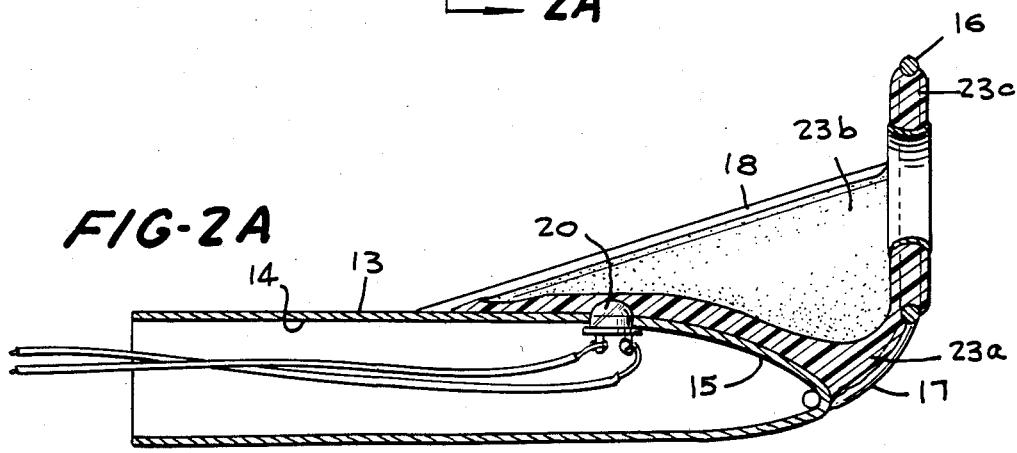
FIG. 2A is a longitudinal vertical section view thereof, taken along the line 2A—2A of FIG. 1.

Referring to the drawings, wherein like reference characters designate corresponding parts throughout the several figures, and particularly to the version of the invention shown in FIGS. 1, 2 and 2A, the fishing pole tip position illuminating device of the present invention, indicated generally by the reference character 10, is designed to be either a retrofit assembly to be assembled onto existing poles or to be provided by a fishing pole manufacturer with the originally supplied fishing pole, and is designed to be assembled onto the end portion 11 of a fishing pole, a portion of which is indicated at 12 in FIG. 2A. In the illustrated embodiment, the fishing pole is a plastic fishing pole having a hollow bore extending through the length thereof from the handle and reel mounting portions (not shown) to the tip end portion 11. The fishing rod may be formed as a tubular shaft which may taper from its butt or handle end to the tip end portion 11 and may be formed of any suitable material, such as fiberglass reinforced plastic or the like. The fishing pole tip position illuminating device or assembly 10 of FIG. 1, FIG. 2 and FIG. 2A, includes a mounting sleeve component or member 13, which may be a metallic tubular member over most of its axial length having a substantially cylindrical or slightly tapered bore 14 sized to receive a predetermined length of the tip end portion 11 of the fishing rod 12, and may convergently taper to a substantially closed outer end 15 to receive ring supporting leg members for the fishing line tip ring or guide ring 16 as later described. The mounting sleeve component 13 is designed to have an appropriate axial length of the tip end portion 11 inserted into the bore 14 and be adhered therein by an adhesive coated on either the exterior surface of the tip end portion 11 or the interior surface of the bore 14 which confronts the surface of the tip end portion 11 inserted therein.

Affixed to and curving outwardly and upwardly from the tapered or substantially pointed outer end portion 15 of the mounting sleeve component 13 are a lower pair of upwardly curving supporting legs 17 joining lower portions of the fishing line tip guide ring 16 at circumferentially spaced points along the lower arcuate portion of the tip ring 16 and an upper pair of substantially straight guide ring supporting legs 18 are also provided, each fixed at their rearmost ends to the cylindrical mounting sleeve member 13 and fixed at their outer ends to the fishing line guide ring or tip ring 16 at diametrically opposite spaced points substantially midway between the uppermost and lowermost portions of the tip ring as illustrated.

In the illustrated embodiment of FIGS. 1, 2 and 2A, a circular opening 19 is provided in the upwardly facing portion of the mounting sleeve member 13 substantially midway between the longitudinal locations where the upper straight supporting legs 18 and lower curving supporting legs 17 join the sleeve member to receive a substantially dome shaped LED light emitter 20 of conventional construction. The dome shaped portion of the LED light emitter 20, in accordance with conventional practice, may be formed of a plastic encapsulation lens forming portion which extends upwardly from a slightly larger diameter base portion or "header" and have a pair of terminals, indicated in broken lines at 20a and 20b which are soldered to a pair of power supply leads or conductors 21a, 21b extending rearwardly through the bore 14 of the mounting sleeve member 13 to be joined in any known fashion to supply conductors, such as two wire leads of an insulated two wire cable or the like extending through the hollow center bore of the fishing rod from a battery holder and connecting arrangement (not shown) of conventional type mounted in or carried by the handle portion of the fishing rod. Alternatively, the two conductor cable or pair of conductors can be brought out to the exterior surface of the fishing rod and connected to a battery supply source such as a small lithium battery fixed to the tip end portion of the fishing rod.

The LED light emitting element 20 may be of any of the commercially available types producing different colors as is well known in the art, for example the type producing either red or green emission, for example by varying the proportions of gallium arsenide (GaAs) and gallium phosphide (GaP) as the emitter for the forward biased pn junction semiconductor device. In the preferred embodiment, a green emitter using GaP at wavelengths of about 550-560 nm may be used which, although it has poor efficiency due to reabsorption, is desirable in practice because the poor efficiency is offset by the increased sensitivity of the human eye to this wavelength.

In the preferred embodiment herein described, the region of the tip position illuminating device 10 occupied by the LED light emitting element 20 and the region between the upper straight ring supporting legs 18 and the upwardly curving lower ring supporting legs 17 and the space between the legs 17 along a zone is substantially the lower half of the radius of the guide ring 16 as well as annulus having an inner diameter about half the normal diameter of the guide ring 16, as indicated at 23a, 23b and 23c in FIG. 2 are filled with a molded epoxy resin plastic molded in situ, serving the encapsulate the LED light emitter 20 and serve to help diffuse the light emitted by the LED. In one preferred embodiment, this epoxy resin plastic material cast in place encapsulating the LED light emitter 20 and the adjacent areas of the tip ring supporting legs 17, 18 and the annulus 23 of the tip ring may be impregnated with luminous or phosphorescent material to further enhance the light emitting qualities of this embodiment.

An alternate embodiment is shown in FIGS. 3, 4 and 5, wherein the components corresponding to those shown in FIGS. 1, 2 and 2a are indicated by reference characters which are the primes of the reference characters used in the FIGS. 1 and 2 embodiment. In the embodiment of FIGS. 3, 4 and 5, the mounting sleeve member 13' having the hollow bore 14' and the tapered forward end portion 15' supports an LED light emitter 20' similar to that of the previously described embodiment, but wherein, instead of using the encapsulating epoxy resin molded formation 23a, 23b and 23c of the earlier embodiment, the tip ring 16' is fitted with a preformed annular phosphorescent guide ring bushing 25 having a rounded outwardly convex outer perimeter 25a interrupted by a concave groove 25b extending entirely around the perimeter thereof of proper diameter to be press fitted into the tip ring 16' and be held securely therein, and having a concave inwardly facing inner surface 25c shaped and sized to receive a ceramic line guide 26 having an outwardly convex outer perimeter 26a and a central opening 26b through which the fishing line passes. With this arrangement, the light emitted by the LED light emitter 20' activates the fluorescent line guide bushing 25 to cause it to florese and produce a ring of florescent light inwardly bonding the tip ring 16' of appropriate color determined by the florescent materials impregnated in the florescent material, enhancing the visibility of the tip portion of the fishing rod due both to the light emitted by the phosphorescent bushing activated by the light generated by the LED light emitter 20' as well as permitting visible observation of the position of the tip from the illuminated LED globe type light emitter 20'.

FIG. 6 illustrates a form of the device similar to FIGS. 3-5, but wherein a fuse-shaped LED 20a in the form of an elongated cylinder of semiconductor material 20b having contact terminals 20c and 20d at opposite ends and pn junction members 20e and 20f is substituted for the dome type LED and is received in a cavity 14a in the sleeve member 13'. The opposite ends of the cavity are provided with electrical supply contacts 14b, 14c, one of which is movable and spring biased, to engage the ends of the LED 20a and hold it in the cavity 14a.

FIGS. 7, 8, 9 and 10 show a further arrangement for the fishing pole tip position illuminating device of the present invention, wherein, instead of employing an LED illuminating device, such as the LED member 20 of the previously described embodiments, a specially made annular LED member, here indicated by the reference characters 40a, 40b and 40c, is provided with electrical supply terminals 41a and 41b for connection to the cathode and anode portions of the LED device provided internally within the annular body 42 of conventional materials used for light emitting diodes, for example either the gallium arsenide or gallium phosphide types of basic optical semiconductors. The leads 41a, 41b extend from the annular body 42 for connection to electrical leads either to a portable battery such as a lithium battery mounted adjacent the tip of the fishing rod or to leads extending through or along the length of the fishing rod to a battery supply source in the handle portion. As in the case of the phosphorescent line guide bushing 25 of the FIG. 5 arrangement, the annular body 42 of the annular LED member may have an outwardly convex perimeter, as indicated at 42a in FIG. 8 interrupted by a concave annular groove 42b to be press fitted into the tip guide ring 16 of the fishing pole or the outer perimeter of the annular body 42 may be simply an uninterrupted cylindrical outwardly facing surface, as indicated at 42c in FIGS. 9 and 10 sized to correspond to the inner diameter of the guide ring 16 of the fishing pole and be adhesively or otherwise secured in the guide ring 16. If desired, plastic, ceramic or metallic line guide inner rings 43 may be provided and fixed in any desired manner within the center opening of the annular body 42 of the annular LED members 40a, 40b or 40c for the fishing line to be passed through the inner opening of the inner liner ring 43 to protect the material forming the annular LED 40a, 40b or 40c. If desired, the annular LED member 40a, 40b and 40c and the surrounding portions of the tip mounting sleeve member in the region between the upper and lower ring supporting arms 17', 18' may be encapsulated in epoxy resin as in FIGS. 1, 2 and 2A embodiments to improve the structural integrity of the system.

I claim:

1. A lightweight, compact, fishing pole tip position illuminating device attachable to the tip end of a fishing pole to indicate to a person using the pole the position and movement of the pole under conditions of low visibility, a tip assembly including a substantially cylindrical mounting sleeve member and a fishing line guide ring formation, the sleeve member having a bore extending through most of its length opening rearwardly thereof of a diameter corresponding substantially to the diameter of the tip end of the pole to be fitted onto and fastened to the tip end of the fishing pole, said guide ring formation having a circular guide ring portion and supporting arms fixed to said guide ring portion and to said mounting sleeve member to position said guide ring portion at the tip end portion of the fishing pole, a junction diode type LED light emitter means incorporated in said tip assembly, and light circle photoluminescence means receiving light energy from said LED light emitter means for producing at least a circular zone of visible light extending adjacent the circular path of said guide ring portion, and electrical supply means for energizing said LED light emitter means wherein said light emitter means and said light circle photoluminescence means are formed as a circular LED member conforming to and carried as an encircling annulus bonding confronting surface portions of said circular guide ring portion.

2. A fishing pole tip position illuminating device attachable to the tip end of fishing pole to indicate to a person using the pole the position and movement of the pole under conditions of low visibility, a tip assembly including a substantially cylindrical mounting sleeve member and a fishing line guide ring formation, the sleeve member having a bore extending through most of its length opening rearwardly thereof of a diameter corresponding substantially to the diameter of the tip end of the pole to be fitted onto and fastened to the tip end of the fishing pole, said guide ring formations having a circular guide ring portion supporting arms fixed to said guide ring portion and to said mounting sleeve member to position said guide ring portion at the tip end portion of the fishing pole, a junction diode type LED light emitter means incorporated in said tip assembly and light circle photoluminescence means receiving light energy from said LED light emitter means for producing at least a circular zone of visible light extending adjacent the circular path of said guide ring portion, and electrical supply means for energizing said LED light emitter means, said light circle photoluminescence means being a circular LED member conforming to and carried as an encircling annulus bounding confronting surface portions of said circular guide ring portions, said LED light emitter means and light circle photoluminescence means being in the form of an annular semiconductor LED device sized to fit within and be supported by said guide ring portion and includes anode and cathode connector terminals and anode and cathode devices within the annular LED light emitter means for producing a ring of light at the circular surface portions of said guide ring.

3. A fishing pole tip position illuminating device as claimed in claim 1 wherein said means photoluminescence for receiving light energy from the LED light emitting means is a ring of phosphorescent material carried by the guide ring and activated by the light emitted by said LED light emitter to emit said circular zone of light.

4. A fishing pole tip position illuminating device as claimed in claim 2 wherein said means for receiving light energy from the LED light emitting means is a ring of phosphorescent material carried by the guide ring and activated by the light emitted by said LED light emitter to emit said circular zone of light.

5. A fishing pole tip position illuminating device attachable to the tip end of a fishing pole to indicate to a person using the pole the position and movement of the pole under conditions of low visibility, a tip assembly including a substantially cylindrical mounting sleeve member and a fishing line guide ring formation, the sleeve member having a bore extending through most of its length opening rearwardly thereof of a diameter corresponding substantially to the diameter of the tip end of the pole to be fitted onto and fastened to the tip end of the fishing pole, said guide ring formation having a circular guide ring portion and supporting arms fixed thereto and to said mounting sleeve member to position said guide ring portion at the tip end portion of the fishing pole, a junction diode type LED light emitter means incorporated in said tip assembly, light circle photoluminescence means receiving light energy from said LED light emitter means for producing a circular zone of visible light immediately inwardly of the circular path defined by said guide ring portion, and electrical supply means for energizing said LED light emitter means, said light circle photoluminescence means being in the form of a rigid circular separable photoluminescent ring member conforming to and carried as an encircling annulus inwardly bounding and abutting the confronting radially inwardly facing surface of said circular guide ring portion, and wherein said LED light emitter means is in the form of a semiconductor LED device carried on and supported by said mounting sleeve member and includes anode and cathode connector terminals and anode and cathode components within the LED device for producing source radiation for activating said photoluminescence means to produce visible radiation.

6. A fishing pole tip position illuminating device as defined in claim 5, wherein said inwardly facing surface of said guide ring portion is of convex arcuate cross-sectional shape extending in a circular path and having a slightly smaller inner diameter than said photoluminescent ring member and the latter has an outwardly facing convex outer peripheral surface interrupted by an annular outwardly opening groove shaped to receive said inwardly facing surface of said guide ring portion intimately fitted therein.

* * * * *